R. M. GILSON.
ELECTRIC MOTOR.
APPLICATION FILED JAN. 11, 1912.
1,147,168.
Patented July 20, 1915.
FIG. 1
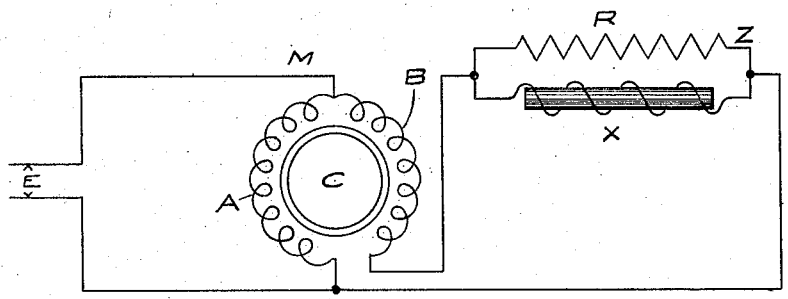
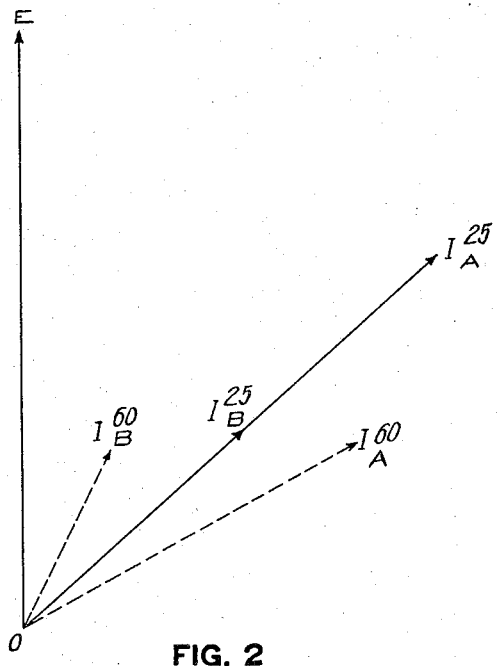
FIG. 2
WITNESSES
INVENTOR

UNITED STATES PATENT OFFICE.

ROBERT M. GILSON, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA.

ELECTRIC MOTOR.

1,147,168. Specification of Letters Patent. Patented July 20, 1915.

Application filed January 11, 1912. Serial No. 670,578.

*To all whom it may concern:*

Be it known that I, ROBERT M. GILSON, a citizen of the United States, residing at Pittsburgh, in the county of Allegheny and State of Pennsylvania, have invented certain new and useful Improvements in Electric Motors, of which the following is a specification.

My invention relates to alternating current motors, and particularly to motors which are arranged to be operative by a current of a predetermined frequency and to be inoperative by current of another frequency.

I will describe one form of motor embodying my invention, and then point out the novel features thereof in claims.

In the accompanying drawings, Figure 1 is a view showing diagrammatically one form of electric motor embodying my invention; and Fig. 2 is a vector diagram showing the relations between currents and voltages in the windings of the motor shown in Fig. 1 under different conditions of frequency.

Similar reference characters refer to similar parts in each of the views.

One feature of my invention is the provision in connection with an induction motor having two windings, of an inductive reactance and a resistance connected in parallel and included in circuit with one of the windings, the said windings and connections being so proportioned that at one frequency the two motor windings coact to produce torque on the rotor of the motor and that at another frequency the two motor windings coact to produce no torque, whereby the motor will operate on the first mentioned frequency and will not operate on the last mentioned frequency. This adjustment is due to the fact that the power factor of the circuit including the reactance and resistance increases when the frequency is increased and decreases when the frequency is decreased.

Referring now to the drawings, M designates a motor of the two-winging type, here shown as being an induction motor comprising two stator windings A and B, and a rotor C. The rotor instead of being of the usual squirrel cage type preferably comprises only a cylindrical shell of electro-conductive material such as aluminum or copper. One of the windings, here shown as being winding A, is connected directly across a source of current E; the other winding B is included in a circuit which also includes a modifying means Z. As here shown, this means comprising an inductive reactance X and a non-inductive resistance R connected in multiple and the whole included in series with winding B.

In the case of the induction motor here shown, the windings and the modifying means may be so adjusted that when voltage of a certain predetermined frequency is impressed at E, the currents in the windings A and B are substantially in phase and no torque is produced; but that when voltage of a higher frequency is impressed at E, the power factor of the circuit of winding B increases and that of the circuit of winding A decreases slightly so that the currents in the two windings then differ in phase, and a torque is produced. For example, assume that it is desirable that the motor should have no torque at 25 cycles, but that it should have torque at 60 cycles. The parts are then so adjusted that at 25 cycles the current in the two windings are substantially in phase, as indicated by $I_A^{25}$ and $I_B^{25}$ in Fig. 2. If now current of 60 cycles is impressed at E, the power factor of winding A decreases and the angle of the lag of the current in winding A consequently increases as indicated by $I_A^{60}$ in Fig. 2. The power factor of the circuit of winding B however increases, for the reason that the flow of current through the reactance X decreases and the flow through the resistance R for a given voltage across this impedance Z remains substantially the same as it was; in other words, the power factor of the modifying means Z is higher for the 60 cycle current than for the 25 cycle. Hence the angle of the lag of the current in winding B is decreased and may be indicated by $I_B^{60}$. With 60 cycles then the currents in the two windings are displaced in phase and the motor will have torque.

A motor embodying my invention may be advantageously employed as the actuating element of a relay for railway signaling purposes. For example it may be employed in a relay of the type shown and described in United States Letters Patent No. 1,003,338 granted to John P. Coleman on Sept. 12, 1911. The relay is then particularly adapted for track relays for use on railways employing alternating propulsion current. In such cases the frequency of the propulsion current is usually 25 cycles and that of the signaling current 60 cycles. It will be clear that with the particular adjustment hereinbefore mentioned, the relay will respond to the signaling current and not to the propulsion current.

Although I have herein shown and described only one form of modifying means embodying my invention, it is understood that various changes and modifications may be made therein within the scope of the appended claims without departing from the spirit and scope of my invention.

Having thus described my invention what I claim is:—

1. In combination, a motor having two co-acting windings, a source of alternating current, a circuit for each winding connected with said source, and an inductive reactance and a non-inductive resistance connected in multiple and included in series with one of the windings for causing the power factor of said winding to increase when the frequency increases and decrease when the frequency decreases.

2. In combination, a motor having two co-acting windings, a circuit for each winding, a source of alternating current for said circuits, and means comprising an inductive reactance and a non-inductive resistance connected in multiple and associated with one of said circuits for causing the power factor of the circuit to increase with increase of frequency and decrease with decrease of frequency.

3. In combination, a motor having two co-acting windings, a circuit for each winding, a source of alternating current for said circuits, and means comprising an inductive reactance and a non-inductive resistance connected in multiple and associated with one of said circuits, the parts being so adjusted that with current of one frequency the power factors of said circuits are substantially equal, whereby with current of a higher frequency the power factor of the circuit with which the said means is associated increases while the power factor of the other circuit decreases.

In testimony whereof I affix my signature in presence of two witnesses.

ROBERT M. GILSON.

Witnesses:
A. L. VENCILL,
MENA QUEALER.

Copies of this patent may be obtained for five cents each, by addressing the "Commissioner of Patents, Washington, D. C."